Figure 1:
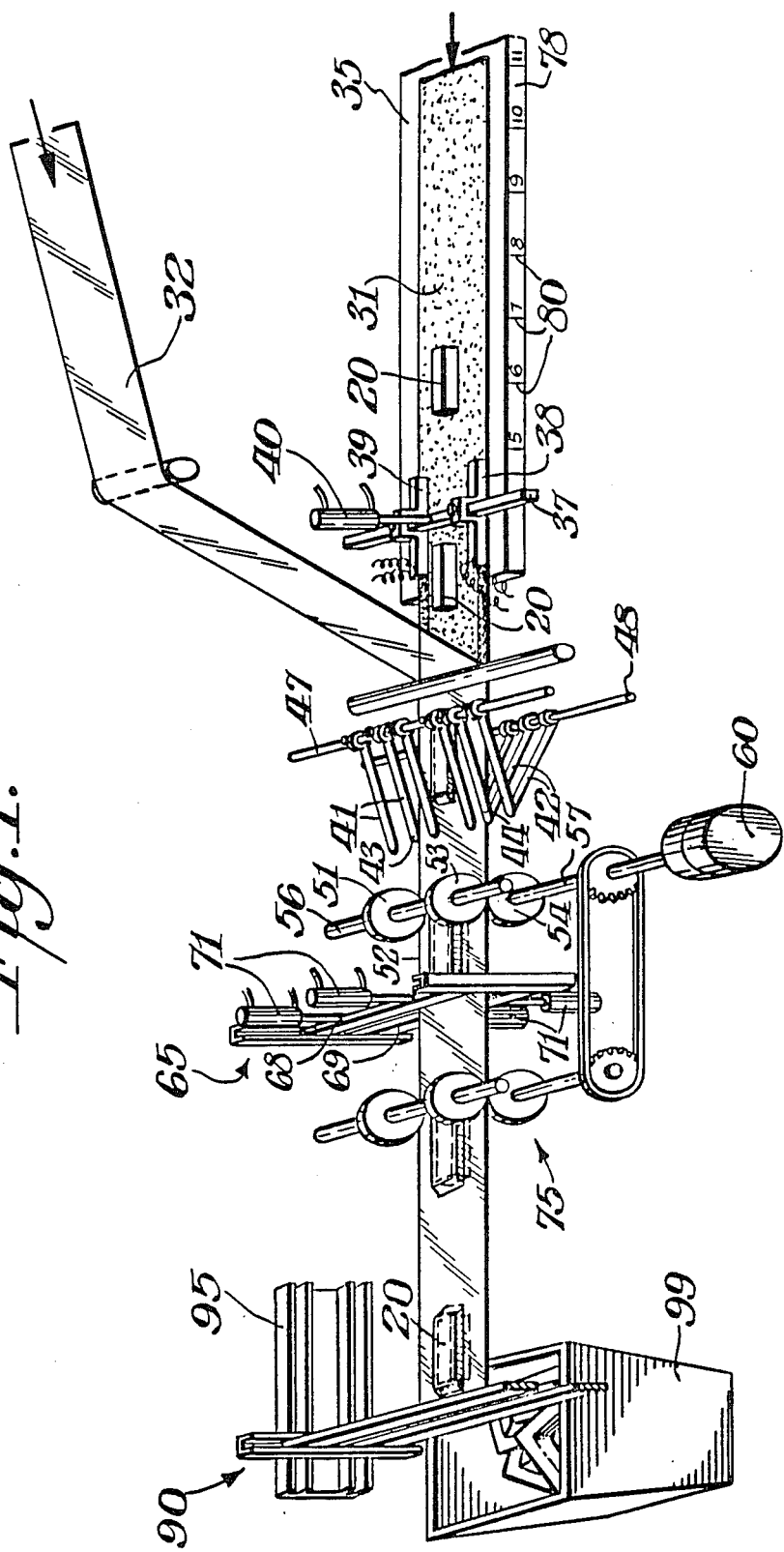

United States Patent [19]

D'Angelo

[11] Patent Number: 4,774,800
[45] Date of Patent: Oct. 4, 1988

[54] PACKAGING

[75] Inventor: Joseph J. D'Angelo, Wyckoff, N.J.

[73] Assignee: The Crowell Corporation, Newport, Del.

[21] Appl. No.: 913,071

[22] Filed: Sep. 26, 1986

Related U.S. Application Data

[63] Continuation-in-part of Ser. No. 645,887, Aug. 31, 1984, abandoned.

[51] Int. Cl.$^4$ ............................................. B65B 9/02
[52] U.S. Cl. ........................................ 53/553; 425/520
[58] Field of Search .................. 53/441, 450, 453, 553, 53/554, 555, 556, 455, 562; 425/520

[56] References Cited

U.S. PATENT DOCUMENTS

| | | | |
|---|---|---|---|
| 2,208,951 | 7/1940 | Tamassy | 53/554 X |
| 2,438,089 | 3/1948 | Carson | 53/41 |
| 2,468,517 | 4/1949 | Salfisberg | 53/554 X |
| 2,586,445 | 2/1952 | Stalter | 53/555 X |
| 2,586,580 | 2/1952 | Truscott | 53/553 X |
| 2,597,041 | 5/1952 | Stokes | 53/555 X |
| 2,597,042 | 5/1952 | Stokes et al. | 425/520 X |
| 2,608,405 | 8/1952 | Salfisberg et al. | 53/555 X |
| 2,737,764 | 3/1956 | Lewis | 53/553 X |
| 3,735,551 | 5/1973 | Pratt | 53/553 X |

Primary Examiner—Horace M. Culver
Attorney, Agent, or Firm—Connolly & Hutz

[57] ABSTRACT

Packaging of series of relatively small articles between long webs of wide packaging laminates having faces of resilient heat sealable foam. One web is fed foam-face-up across a table, the articles to be packaged placed on it in spaced locations, heated melting shoes applied to web edges to melt the foam surfaces there, and a second web applied foam-face-down over the spaced articles and heat sealed to the lower web at its melted edges. Melting shoes can have their surfaces treated to make them essentially non-wettable by the melted foam. Transverse heat sealing and severings are effected between successive articles. The heat sealings can be set by cold pressings. Web backings can be made relatively non-porous to minimize bleed-through of melted foam. Before sealing, sandwiched articles can be pressed between upper and lower resilient fingers to urge articles to level at which they project up as much as they project down, from plane of web edges.

6 Claims, 3 Drawing Sheets

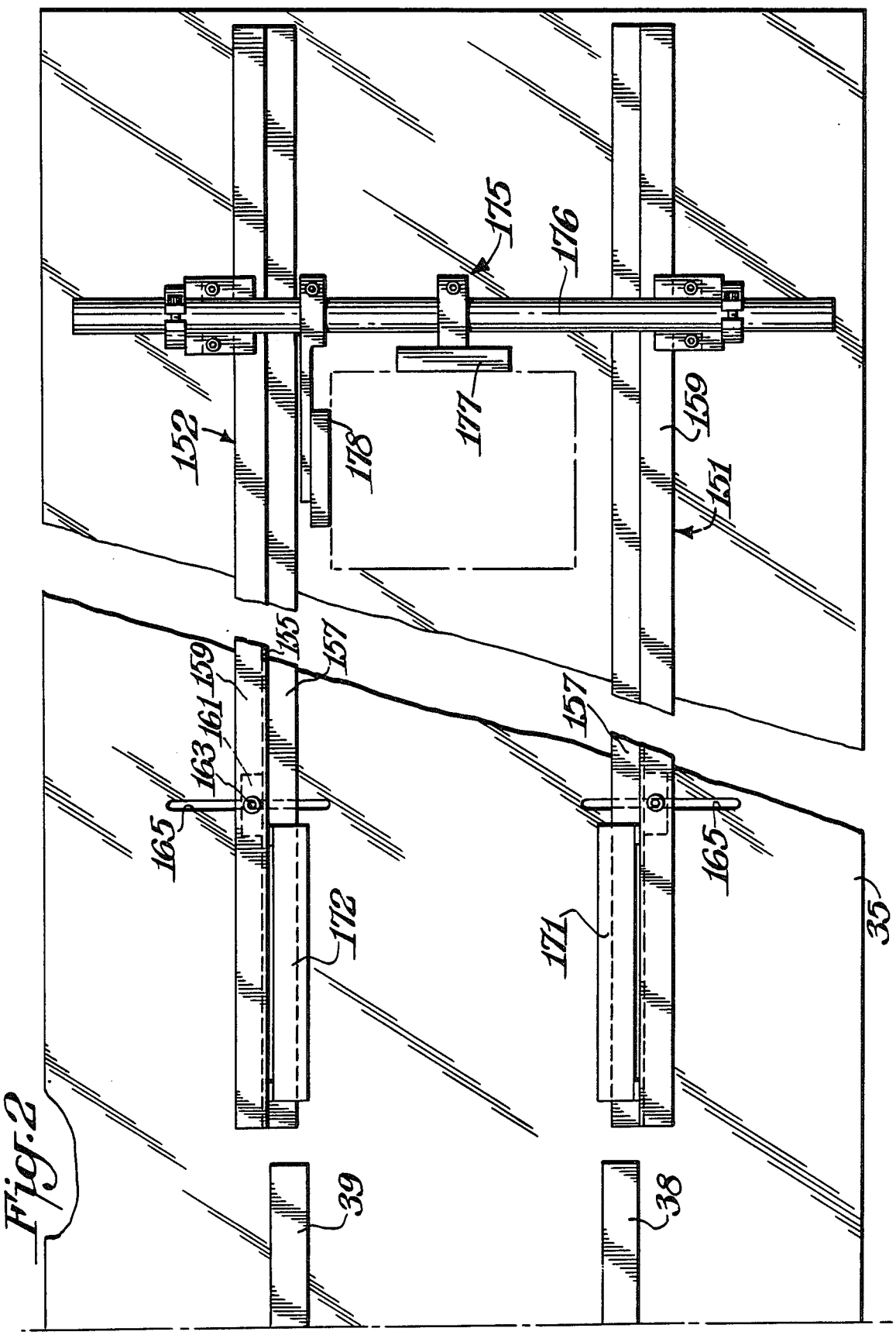

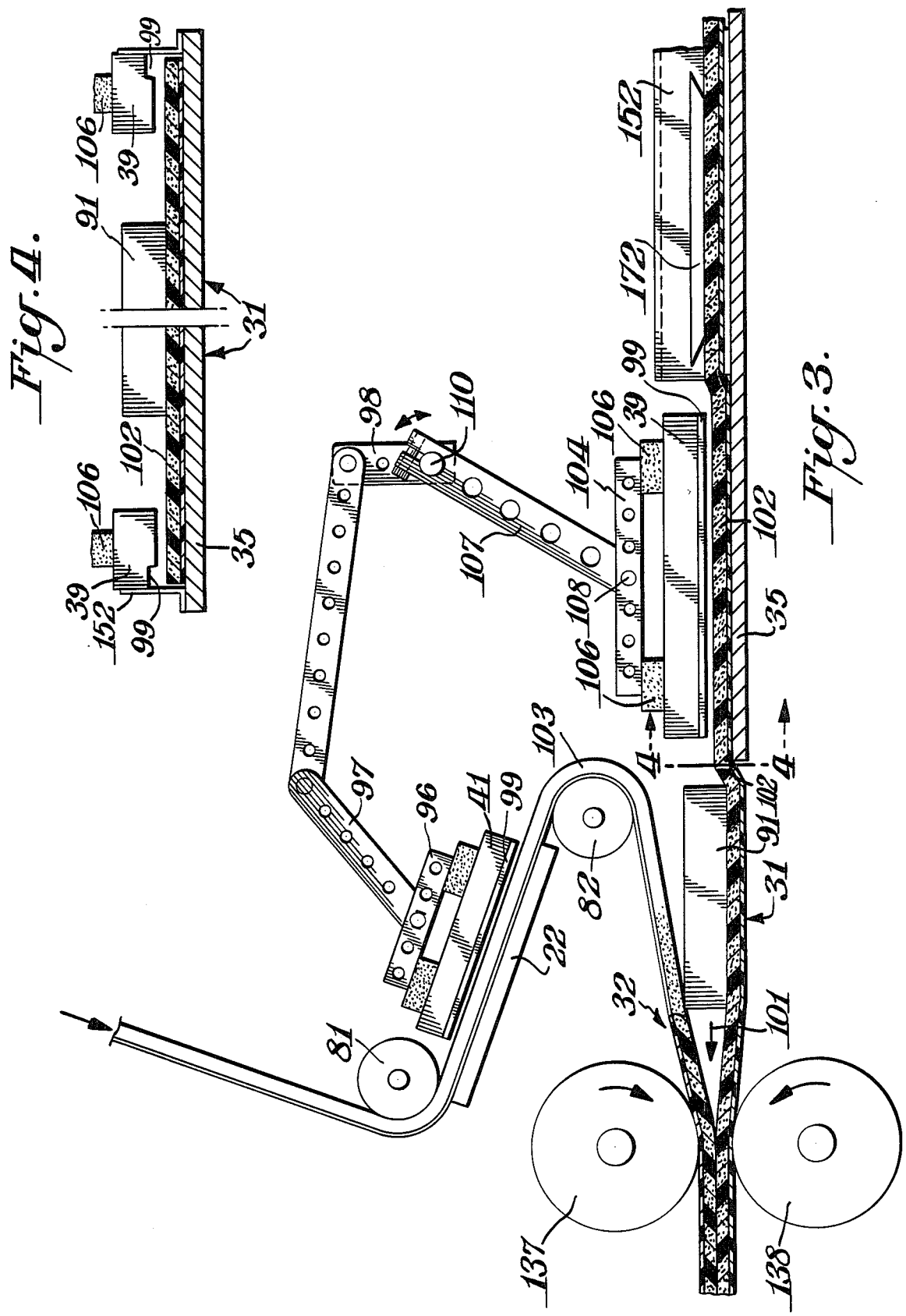

PACKAGING

This application is a continuation-in-part of application Ser. No. 645,887 filed Aug. 31, 1984 and subsequently abandoned.

The present invention relates to automatic packaging, more particularly to the automatic packaging of relatively small articles in foam-lined wrappers.

Among the objects of the present invention is the provision of novel packaging equipment and novel packaging techniques which are commercially attractive.

These, as well as additional objects of the present invention, will be more fully understood from the following description of several of its exemplifications, reference being made to the accompanying drawings wherein:

FIG. 1 is a diagramatic illustration of an automatic packaging apparatus pursuant to the present invention; and FIGS. 2, 3 and 4 are top, side and sectional views, respectively of modified aspects of the apparatus of FIG. 1.

According to the present invention, a backed sheet of thermoplastic foam is heat sealed to a desired surface by applying to the face of the foam at the proposed sealing location on the sheet, a melting shoe held at a temperature high enough to melt the foam, then pressing that sealing location against the desired surface to bring the melted foam into sealing contact with that surface, and maintaining the pressing while causing the melted foam to cool and solidify. The pressing need not immediately follow the melting, but can be delayed a few seconds and thus permit partial cooling.

The heat sealing can be against another backed sheet of foam, or another portion of the same backed sheet, as for instance, to form an envelope or wrapper for packaging articles. Such packaging is shown in U.S. Pat. No. 4,253,892, as well as in U.S. patent application Ser. No. 589,699 filed Mar. 15, 1984, now U.S. Pat. No. 4,601,157 granted July 22, 1986.

Polypropylene resin is a very suitable composition for the thermoplastic foam of both backed sheets, although polyethylene foam and polystyrene foam, as well as other heat-sealable foams, can be used. Thermoplastic resins, when melted by the above-mentioned melting shoe and then pressed, tend to bleed through a porous backing layer like paper. To inhibit or completely prevent such bleed-through, such porous backing layers can be rendered more impervious as by providing a metallized stratum on the foam-engaging surface of the backing layer. A layer of metal foil such as 0.0003 inch thick aluminum between the foam layer and a paper backing layer is also very effective in preventing bleed-through.

In packaging articles between two long advancing sheets or webs of the backed foam, as in the above-cited prior processes, it is preferred that the heat-sealing at the longitudinal edges of the advancing sheets be effected with the help of the above-mentioned melting shoes, and the transverse heat sealing be effected between pressing members each of which engages the backing layers of the backed foam laminate. Preferably each transverse seal is made by two pressings, the first pressing being between heated pressing members that are hot enough for the heat to penetrate through the backing layers and thus bring the foam layers to heat-sealing temperature. The second pressing is between pressing members that cool the hot pressed location to set the heat seal. The pressing members for the second pressing can also be combined with a cutting mechanism to sever the packages that are completed by that pressing.

For best results when doing the foregoing type of packaging of a succession of articles, each of substantial height, between two advancing long wrapper webs or sheets, the sheets covering the articles sandwiched between them are advanced at a pre-determined level between upper and lower resilient members or fingers that urge the carried articles toward that level from above and below. This makes the packaging essentially symmetrical with respect to that level, and is more effective than the prior art use of upper fingers with a lower fixed non-resilient stop that can be adjusted in position.

Turning now to the drawings, FIG. 1 diagrammatically illustrates the packaging of a succession of articles 20, such as small packages of pharmaceuticals or engine parts, between a lower wrapper web or sheet 31 and an upper wrapper web or sheet 32. Sheet 32 is a paper-foam laminate, and sheet 31 is a paper-foil-foam laminate, as described for instance in U.S. Pat. No. 4,321,297. Lower sheet 31 is unwound from a supply reel that is not shown, and fed foam-side up across the top of a loading table 32. As that sheet traverses the table, a spaced succession of the articles 20 are placed on its upper surface either by hand or with automatic article feeders.

At the discharge end of table 35, the side edges of sheet 31 pass under melting bars 38, 39 which are electrically heated and have their lower faces about ½ inch wide and about 4 to 10 inches long resting on the foam surface. Guide pins can be mounted in the table top along both edges of sheet 31 to help assure proper alignment of the sheet with the melting bars.

The melting bars are heated to temperatures high enough to melt at least some of the foam which they contact. Where the foam is polypropylene, the temperature, as measured at the heating coils inside the melting bars, can be about 500° to about 550° F. For other plastics that melt at temperatures lower than polypropylene does, the heating coils can be at lower temperatures. It should be noted that the temperature of the melting bars' foam-engaging surfaces is much lower than the coil temperature.

The physical interaction between the melting bars and sheet 31 may tend to cause the sheet edges to move toward each other to cause the central portion of the sheet to bulge upwardly. The weight of the articles 20 resists such distortion, and the distortion resistance can be further opposed by fitting some rollers or spring fingers over sheet 31 where it approaches the melting bars, to press the sheet against table 35 between articles 20 and the melting bars.

Further travel of sheet 31 brings it and the articles carried by it under the upper sheet 32 which is laid over it with the foam layer of sheet 32 facing downwardly. This sandwich moves between a set of downwardly biased upper spring fingers 41 and a set of upwardly biased lower spring fingers 42. These sets of spring fingers are held in adjustable positions along rods 47 and 48 and can be adjusted so that some of the fingers act as edge guides for the sandwiched sheets, as illustrated at 43, 44.

There is no table or other lower support for the sandwiched assembly at the location of the fingers 41 and 42, so that the fingers, all of which have about the same resilience, cause each sandwiched article to be held so that it projects about equally above and below the plane of the sheets. This symmetrical positioning helps keep the edges of the upper sheet 32 aligned with the edges of the lower sheet 31, even though the bulge in the sandwich caused by the sandwiched article draws the edges of each sheet toward each other.

Immediately downstream of the fingers 41 and 42, is a set of advancing pinch rollers 51, 52, 53 and 54 that are strongly urged toward each other to engage the side edges of the sandwiched assembly and cool them as well as pinch them together. This cools and sets the melted foam to complete the lateral edge sealing of the sandwiched articles. These pinch rollers are adjustably fixed on elongated shafts 56 and 57 and only one of the shafts need be driven as by electric motor 60, to pinch and pull the sandwiched assembly through the apparatus.

The circumferences of the rollers can be accurately dimensioned to pre-determined size so that their rotations can be accurately counted and their drive motor controlled as by an electric clutch-and-brake assembly operated by an adjustable counter, to advance the sandwiched assembly in steps, each step corresponding to the length of each package to be formed about an article 20. The rollers themselves are preferably made of steel or aluminum and made as wide as the melting bars 38 and 39 so that the pinched-together rollers effectively cool and set all the plastic melted by the melting bars.

Just downstream of the advancing rollers is a transverse heat-sealing bar mechanism 65. Two electrically heated bars 68 and 69 extend transversely across the sandwiched assembly, one above and the other below that assembly. The bars are held for vertical reciprocation on vertically oriented side rails (not shown), and are vertically actuated by air cylinders 71. When retracted from the sandwiched assembly, the bars should leave sufficient clearance above and below that assembly to permit the passage of the tallest article 20 to be packaged. A similar clearance should be provided by the shafts 56 and 57 that hold the advancing rollers, and for any melting bar holder such as lifting bar 37 that can be lifted as by air cylinder 40 to lift the melting bars up and away from sheet 31, as for example when the equipment is not being used or its use is halted.

The sandwiched assembly is advanced in steps in the downstream direction, and the stationary dwell time is adjusted to provide the time required by the transverse bars 68 and 69 to effect heat sealing. Thus, when these bars are heated to an internal coil temperature of 550° F., 1½ seconds may be required for the bars to cycle into, through and out of pressing engagement against the upper and lower faces of a sandwiched assembly in which the foam is polypropylene resin and the foam is backed by Kraft paper or a paper-aluminum foil laminate about 5 mils thick. The dwell is best controlled by a pre-set adjustable timer. The lateral pressing cycle can start slightly before the downstream movement of the sandwich stops, and the downstream movement can resume slightly before the cycle ends.

Where the backing layer is a film of aluminized polyethyleneterephthalate not over about 1 mil thick, the cycle time for the transverse bars can be as little as one second.

Another set 75 of advancing rollers can be provided downstream of the transverse sealing bar mechanism 65, if desired. Such an extra set helps assure the proper advancing of the sandwiched assembly, particularly when the advancing is abruptly started after the completion of a stationery transverse heat-seal dwell.

The distance between successive transverse heat-seals corresponds to the spacing between locations of the individual articles 20. Accordingly, the setting that fixes the amount of advancement effected by motor 60 in one advancement step, can be keyed to an indicator that designates where articles 20 are placed on sheet 31.

As shown in FIG. 1, the edge 78 of table 35 can be provided with scale markings 80 designating the locations of articles 20 when the successive advancement steps range for example from 5 inches to 11 inches. The five-inch marker would then be measured upstream from the transverse heat-seal bars a whole number of multiples of five inches, plus the 2½ inches needed to locate the center of the next 5-inch space. The six-inch marker would similarly be measured to whole numbers of multiples of six inches—plus 3 inches, etc. These markers would then show where the appropriate articles 20 are to be located while the sandwich assembly is stopped during a transverse heat-seal pressing. Packages to be made with lengths intermediate between those designated by markers 80 can have their locations interpolated between the appropriate markings.

If desired a separate set of marked strip scales can be provided, one such scale having a group of markings exactly 5 inches apart, another exactly six inches apart, etc. For a specifically dimensioned package, the appropriate strip scale can then be mounted over table edge 35 with one marking of that strip scale aligned with the appropriate marking 80. The strip scale then indicates where a series of articles 20 are to be positioned when the sandwich movement pauses during transverse heat sealing. This enables the accurate positioning of a number of the articles during a single such pause.

The final stage in the heat-sealing sequence is effected with a set 90 of pressing-and-severing bars. These bars can be very similar to the heat-sealing bars 68 and 69 but do not require heating, and a serrated cutting blade is fitted in the sandwich-engaging face of one bar so as to protrude and cut through the sandwich. A groove can be formed in the other pressing-and-severing bar to mate with and receive the protruding blade when it penetrates through the sandwich.

The pressing-and-severing bar mechanism, including its vertical press-guiding rails, is held between longitudinally directed side rails 95 to which it can be fastened at a location that causes its bars to press and sever the sandwich exactly at the transverse heat seal formed by the mechanism 65. Preferably the pressing-and-severing is effected one advancing step, but not more than two advancing steps, downstream from the first transverse heat-pressing. The pressing-and-severing bars then do a good job of cooling and setting the transverse heate seal, particularly if the faces of the pressing-and-severing bars contacting the sandwich are made of a metal such as aluminum.

Where the transverse heat seal has cooled excessively before being engaged by the pressing-and-severing bars, it is helpful to have the latter bars heated to at least partially restore to the heat-seal some of the heat that enables that seal to be set under pressure. Such pressure setting is the preferred heat-sealing technique.

A container 99 can be provided to receive the individual packages as they are severed from the advancing end of the sandwich assembly. They show no bleed-through even through upper sheet 32 contained no bleed-blocking stratum. However both sheets 32 and 31 can contain such strata, if for example it is desired that those sheets be of identical construction.

The bleed-through difficulty at the longitudinal seals can be minimized or completely avoided by careful control of the edge heating. Thus, the melting bars 38 and 39 can be lifted away from the foam face of sheet 31 during the time interval in which that sheet pauses between advancing steps. The resulting edge heating is more uniform in that the large amount of localized heating during advancement pauses, is eliminated. The extra cooling of the melted foam during such no-heat pauses is quite uniform. With such a modification the resulting uniform melting can be controlled so that the melted resin is not too fluid and the porosity of porous foam backings does not permit significant bleed-through.

In place of container 99, a take-off conveyor can be supplied to support and remove cut packages as they leave the base of assembly 90. Such take-off conveyor can be of the belt type with the belt travelling a little faster than the package sandwich, to help assure the clearing of sandwiches from the cutting assembly.

If desired a table can be positioned under the package sandwich as it leaves roller assembly 75, to help guide the sandwich to the cutting bars of assembly 90.

All of the sealing structures of FIG. 1 are of adjustable width, except for the pressing structures 65 and 90. The adjustable widths can accordingly be adjusted to effect the desired packaging with sheets 31 and 32 of any width within the adjustment range, for instance from 5 to 12 or more inches. The pressing structures 65 and 90 extend the full width of the widest adjustment, and accordingly need no separate adjustment.

The packaging output of the apparatus of FIG. 1 can be increased by using wide packaging sheets and packaging two transversely-aligned rows of articles at once. To this end a third melting bar can be longitudinally positioned half-way between the side edges of the sheets, a third pair of pinching-and-advancing rollers can be correspondingly fitted on shafts 56 and 57, and a longitudinally oriented stationery or rotating severing blade can be fitted between the pinching-and-advancing rollers of mechanism 75 to sever the wide dual sandwich assembly into two side-by-side halves as the assembly is pulled through it.

The packaging technique of the present invention can be modified as by eliminating one of the melting bars in FIG. 1 or cutting off its heating current. The packaging operation will then yield packages having an unsealed edge through which articles such as letters can be subsequently inserted, after which the unsealed edge is sealed for example with a simple bag-end heat sealer or by cementing or stapling. In such a modification, the articles 20 need not be pre-packaged in the bags, but can be withheld from the packaging apparatus and later inserted in the open-ended packaging bags thus formed. The finger assembly 41, 42 can then also be omitted.

Instead of using two separate wrapper sheets 31 and 32 in FIG. 1, a single sheet twice as wide as either sheet 31 or 32 can be used. Such a wide sheet can then be automatically folded over along its longitudinal axis to make a sandwich similar to that of FIG. 1, which sandwich can then go through the heat-sealing sequence, but without the melting bar that would otherwise be located where the fold line is. Such a foldover combination is shown in U.S. Pat. No. 3,696,580. Both melting bars can be omitted with such a folded sandwich, if it is desired to make open-ended bags.

When making open-ended bags, the opposing walls of the bags need not be of identical shape at the open end. Thus one bag wall can project out further than the opposite wall, so as to provide a flap that can be subsequently folded over the shorter wall and sealed envelope-style.

If desired the apparatus of FIG. 1 can be fitted with applicators to apply adhesive or heat-sealing improvers such as described in U.S. Pat. Nos. 3,916,076 and 3,393,081, to the sites on sheet 31 and/or sheet 32 before the sealing is effected at those sites. The melting bars can then have their temperatures reduced or the bars completely eliminated. Similarly, the temperature of transverse heating bars 68 and 69 can be reduced, and one set 65 or 90 of the transverse bars can be eliminated.

The packaging sheets of the present invention can be treated or coated with materials, such as anti-static agents, volatile corrosion inhibitors and the like, such as those mentioned in U.S. Pat. No. 4,321,297 and in U.S. patent application Ser. No. 477,241 filed Mar. 21, 1983 (U.S. Pat. No. 4,584,225 granted Apr. 22, 1986). Some coatings of this type improve or do not interfere with the heat-sealing and so can be coated over the entire foam face of one or both packaging sheets. Where such added materials interfere with the heat-sealing, it is preferred that such materials be coated in locations at which heat-sealing is not effected.

With a metal foil or metallized backer contained in one or both of the packaging sheets, the resulting package will protect the article packaged in it against electric fields. Such protection is particularly desirable when packaging transistors or similar electric articles that are constructed for operation at very low voltage. For such protection it is preferred to have the packaging in a single packaging sheet that is folded over as described above. By such fold-over, the metal foil or metallized layer covering one side of the packaged article is electrically continuous with the metal foil or metallized layer covering the other side of the packaged article, so that the protection against electric fields is improved.

For maximum protection against electric fields, copper or silver foils are better than aluminum foils, and thin copper foil with a very thin, e.g. ½ micron thick, flash coating of silver may be most cost-effective. Such a flash coating can be applied to only one face of each foil.

The backing layer covering a foil-carrying sheet can be provided with openings, as for example along its borders, so that a grounding connection can be clipped to those borders and thus ground the foil.

Whether or not the metal foil shielding is one fold-over sheet or two opposing sheets, it is a very effective barrier against the penetration of moisture vapor. Accordingly by doing the packaging in a very low humidity atmosphere, e.g. below 30% relative humidity at room temperature, the danger of corrosion for packaged water-sensitive material is sharply reduced or completely eliminated. Plastic films like polyethylene terephthalate are also good moisture barriers, particularly when they have metallized surfaces.

The rate at which the packaging sheets advance through the packaging sequence can be varied. It is preferred that the time interval between the respective heatings at the melting bars and transverse heat-sealing bars, and the respective pressings at the pinch rollers and transverse bars 90, be not so long as to permit excessive cooling between those pressings. Six seconds can be well tolerated, but about 15 seconds is too long. To keep this time interval small, the number of advancing steps during the interval should be no greater than two. It is generally helpful to complete an advancing step in about one second or less, even if such a step requires a 12-inch or as much as a 20-inch travel. Also, the pressing dwells are preferably no longer than two seconds each.

The melting action of the melting bars is improved when their foam-engaging surfaces are rendered non-wettable by the melted foam. Thus, a one-half mil to one-mil thick layer of polytetrafluoroethylene adherently coated on the melting bars as described, for example, in U.S. Pat. Nos. 3,644,260 or 3,900,658, causes the melting action to be neater, particularly when the foam is polyethylene or similar resin melting, that is becoming fluid, at about 120° C. or lower, so that the surface of the melting shoes is below about 500° F. The non-wettability diminishes the rate at which heat transfers from the melting shoes to the foam, so the temperature of the melting shoes should then be a few degrees higher than when the shoes are wettable.

Coatings of polytrifluoromonochloro ethylene and polysiloxane resins also render the melting shoes essentially non-wettable by melted polyethylene, polystyrene and polypropylene, and provide similar improvements.

FIGS. 2, 3 and 4 illustrate modifications of the apparatus of FIG. 1, and include melting shoes that are also improved in operation by having their surfaces rendered essentially non-wettable. Here, the table 35 which can be fixed has a first elongated length 31 of a backed sheet of foam 102 fed over it in the direction of arrow 101, with its foam face up. Side guides 152 guide the sheet 31 so its side edges will be received by spaced sets of pinching rolls, one set of which, 137 and 138, is shown.

Another elongated sheet 32 of backed foam 103 is fed from overhead with its foam face down, to the same sets of pinching rolls, guided by idler rolls 81 and 82 and a fixed table 22. The pinching rolls are driven and press both side edges of the sandwiched sheets 31 and 32 together while they pull the sandwiched sheets to move them through the apparatus.

A pair of edge hold-downs 172 can be used to help assure that the edges of sheet 31 do not curl up but remain accurately aligned by side guides 152. A spaced series of articles 91 to be packaged are placed on sheet 31, each article preferably centered on the sheet between side guides 152. A centering means can be used as described in FIG. 2.

Sheet 31 then passes under a pair of heated edge melting shoes, 39. Each shoe is held by ceramic insulators 106 on a bar 104 which in turn is pivotally held at 108 on an operating arm 107 clamped to an actuating shaft 110 that rotates to raise and lower the set of melting shoes.

Another set of melting shoes 41 is similarly held over packaging sheet 32 where it passes over table 22. Bar 96 and arms 97 and 98 connect shoes 41 to operating shaft 110, and can be hollow and perforated as can bar 104 and arm 106, to lighten their weight. Table 22 can be tilted up to about 45% with respect to the horizontal or can be made horizontal, as desired, so that the melting shoes 41 engage foam layer 103 in about the same manner as the melting shoes 39 engage foam layer 102. The upper and lower sets of melting shoes accordingly have about the same melting action on both layers of foam and can both have their temperatures controlled by a single thermostat. Electrical heating of the shoes is accordingly simplified.

The melting action of the melting shoes is improved by slightly relieving the outer edges of those shoes. Thus, as shown in FIG. 4, a shallow rabbet 99 is cut into the outer edge of the lower face of each melting shoe. The rabbet extends about ¾ millimeter up from the face of the shoe that engages the foam, and about 3 millimeters into the face, although both dimensions can be varied. Thus, the height of the rabbet can be as little as about ½ millimeter and as much as about 1½ millimeters, and the rabbet can extend into the shoe faces from about 2 millimeters to about 5 millimeters. The relieving can be tapered, as in an edge bevel.

Because of the relieving, the foams 102 and 103 are not melted as much at the outermost portions of their side edges as they are in the balance of the melting zones. Those zones can have a total width of about 8 to about 15 millimeters, and melting of that much foam can cause substantial quantities of foam to be squeezed out by pinch rollers 137 and 138 beyond the side edges of the packaging sheets where that squeezed out melt can gum up the apparatus and look unsightly.

The relieving of the shoe faces lessens the melting action at the very edges of the packaging sheets and thus permits the foam edges there to remain partly unmelted. This unmelted material keeps most or all of the melted foam from being squeezed out the sides of the packaging sheets, and yet does not prevent the tight heat sealing of those sheets to each other. This advantage is obtained whether the faces of foam layers 102 and 103 are free of coatings, or whether they contain a VCI coating or an antistat coating or a combined VCI-antistat coating, such as the VCI and/or antistat mixtures of PCT Application Ser. No. US86/01731 filed Aug. 20, 1986 (published Feb. 26, 1987 as WO 87/01092).

As in FIG. 1, the application of the transverse heat seals with the apparatus of FIGS. 2, 3 and 4 is made with two sets of cross bars. Each set has one of its cross bars above the sandwich to be heat sealed, and its second bar below the sandwich. The first set that operates on the sandwich has both of its cross bars heated to heat up the foam layers to heat-sealing temperature, and the second set has a cutter blade in one of its bars, to cut the sandwich into individual packages. It is desirable to cool the blade-free cross bar of the second set, as by a water-cooling line or by a fan that blows cool air against that bar or against a finned extension of that bar. This arrangement is particularly effective when heat sealing laminates having thick paper supporting layers such as 42-pound liner board. Heating such sandwich for heat sealing causes the support to retain so much heat that it keeps the foam too hot. Accordingly, at the time of the cutting by the second set of cross bars, the foam is too hot to set properly when no cooling is applied.

The above-described cooling enables proper setting of the transverse heat seals.

The heat sealings of the pre-melted foams at the side edges of the laminates is also improved by subjecting them to extended pressing over their entire extent, while the melted foam is hardening. Such an edge-pressing after the roller pressing is readily arranged by providing pairs of longitudinally extending pressing bars above and below each heat sealed side edge of the joined wrapping laminates, and actuating those bars as the packaging undergoes intermittent transverse heat sealings, during those transverse heat sealing pauses. The longitudinal pressing bars are preferably long enough to span the length of wrapper advanced between pressing steps, but need not press the locations that are pressed during the transverse heat sealings.

FIG. 2 shows a feed arrangement for the lower wrapping laminate 31. A pair of Z-section side guides 151 and 152 are positioned on table 35 to guide laminate 31 to the lower melting shoes 38 and 39. For this purpose, the central web 155 of each Z is vertically oriented, the lower webs 157 horizontally directed toward each other, and the upper webs 159 horizontally directed away from each other. Sets of mounting blocks 161 are secured to the outsides of the central webs and have downwardly directed mounting screws 163 which pass down through positioning slots 165 and are locked in position by nuts threaded on their lower ends. Four such mounting arrangements are preferably provided, two for each side guide.

To help assure that the side edges of wrapping laminate 31 are not curled away from the side guides as they approach the melting shoes, holddown bars 171 and 172 can be secured to the inner surfaces of the vertical webs of the side guides and fitted a short distance above their lower webs.

Also shown in FIG. 2 is a loading locator 175 adjustably fitted to the upper webs 159 of the side guides. This locator has a transversely extending rod 176 which adjustably carries a rear stop 177 and a side stop 178. These stops extend downwardly toward and end just above the foam face of laminate 31, and are used to help rapidly and accurately locate the position in which is to be placed an article to be wrapped and heat sealed, while the wrappers pause in a step-wise heat sealing operation. The loading position is determined to be intermediate the locations of the transverse heat seals, and those positions vary as the articles to be wrapped vary in length in the machine direction. Thus, for a series of articles to be packaged, the loading locator 175 is adjusted to the proper location along the side guides, the apparatus then set in operation, and a fresh article placed against the loading stops every time the wrapping laminates pause during a transverse heat sealing step.

The upper wrapping laminate 32 is shown as guided toward the upper melting shoes by a pair of offset rollers 181 and 182 that receive the laminate from an overhead spool. Further guiding can also be provided as for the lower laminate, but generally it is sufficient to hold the overhead spool accurately aligned, and with spool heads that keep the laminate from sidewise shifting on the spool.

Because the wrapping laminates can be as much as ¼ inch thick, they can be spooled up to a diameter of three feet or more, even on a small spool hub. Where such a spool is so positioned that there is only a small angular difference in take-off locations when the spool is full and empty, only a single feed roller 181 or 182 is needed. A similar dual or single feed roller arrangement can be provided for the lower laminate 31.

It is also helpful to apply a little friction to the laminate supply spools to keep them from pre-maturely unwinding.

Obviously, many modifications and variations of the present invention are possible in the light of the above teachings. It is, therefore, to be understood that within the scope of the appended claims the invention may be practiced otherwise than as specifically described.

I claim:

1. In the packaging of a succession of articles by placing them on an advancing packaging sheet and then covering the placed articles by a second packaging sheet which is then sealed adjacent its edges to the advancing sheet, the improvement according to which the articles have a substantial height and the covered article-carrying sheet is advanced at a pre-determined level between fixed upper and lower resilient members that urge the carried articles toward that level from above and below to make the packaging essentially symmetrical with respect to that level.

2. The combination of claim 1 in which the resilient members are springy fingers, some of which also engage and guide the edges of the advancing assembly.

3. The combination of claim 1 in which the packaging sheets are laminates of foam to aluminized polyethylene terephthalate.

4. A packaging apparatus having receiving structure connected to receive a series of spaced articles to be packaged, sandwiched between elongated lower and upper lengths of packaging webs, advancing means connected to advance the sandwiched assembly from the receiving structure to sealing structure at which the webs are edge-sealed together in a longitudinal direction and also sealed together transversely between successive articles, and guide means located between the receiving structure and the advancing means, the guide means having fixed resilient positioning members in the path of the advancing sandwich to resiliently urge the sandwich upwardly from below and downwardly from above toward a pre-determined level, to make the packaging essentially symmetrical with respect to that level regardless of height differences in the articles.

5. The combination of claim 4 in which the positioning fingers include fingers alongside the path of the sandwich edges to laterally guide the advancing assembly toward the sealing structure.

6. The combination of claim 4 in which the packaging webs are foam laminated to a support sheet, and the sealing structure includes edge melting means connected to melt the foam at the edge sealing locations, before the edge-sealing.

* * * * *